(12) United States Patent
Mancini (10) Patent No.: US 11,150,440 B2
(45) Date of Patent: Oct. 19, 2021

(54) SUPPORTING AND HANDLING SYSTEM FOR OPTICAL DEVICES AND INSTRUMENTATION

(71) Applicant: Dario Mancini, Naples (IT)

(72) Inventor: Dario Mancini, Naples (IT)

( * ) Notice: Subject to any disclaimer, the term of this patent is extended or adjusted under 35 U.S.C. 154(b) by 37 days.

(21) Appl. No.: 16/638,966

(22) PCT Filed: Jul. 17, 2018

(86) PCT No.: PCT/IT2018/000099
§ 371 (c)(1),
(2) Date: Feb. 13, 2020

(87) PCT Pub. No.: WO2019/035146
PCT Pub. Date: Feb. 21, 2019

(65) Prior Publication Data
US 2020/0225445 A1 Jul. 16, 2020

(30) Foreign Application Priority Data
Aug. 16, 2017 (IT) .......................... 102017000093806

(51) Int. Cl.
*G02B 7/183* (2021.01)
*G02B 23/04* (2006.01)
*G02B 23/12* (2006.01)

(52) U.S. Cl.
CPC .............. *G02B 7/183* (2013.01); *G02B 23/04* (2013.01); *G02B 23/12* (2013.01)

(58) Field of Classification Search
CPC .......... F24S 23/74; F24S 30/425; F24S 23/71; F24S 23/77; F24S 23/82; F24S 23/80;
(Continued)

(56) References Cited

U.S. PATENT DOCUMENTS

| 3,370,380 A | * | 2/1968 | Petros ...................... E04H 3/00 49/40 |
| 4,111,184 A | | 9/1978 | Fletcher et al. |
| 4,509,501 A | * | 4/1985 | Hunter ................... F24S 23/80 126/602 |

FOREIGN PATENT DOCUMENTS

| EP | 2639618 B1 | 9/2013 |
| WO | 2012079143 A1 | 6/2012 |

OTHER PUBLICATIONS

Ruiz, Elfego; Sohn, Erika; Luna, Esteban; Salas, Luis; Cruz-Gonzalez, Irene: "Lightweightoff-axis 8m class telescope: a case study to ELT appoximation",SPIE, PO Box 10 Bellingham WA 98227-0010 USA, Jul. 7, 2004 (Jul. 7, 2004), XP040183067, (Year: 2004).*

(Continued)

*Primary Examiner* — William R Alexander
*Assistant Examiner* — Sharrief I Broome
(74) *Attorney, Agent, or Firm* — Maschoff Brennan (57) ABSTRACT

A supporting and handling system for optical devices, in particular telescopes, radio-telescopes or sun concentrators, and instrumentation, is described, comprising: a primary unit; an independent secondary unit; first motored means for moving the primary unit; second motored means for moving the secondary unit; an arc-shaped structure equipped with sliding guides in altitude with respect to the ground for the rotation of the secondary unit with respect to an altitude rotation axis; a hexapod system to move the primary unit; and a control system.

7 Claims, 4 Drawing Sheets

(58) Field of Classification Search
CPC ...... F24S 50/20; F24S 2023/874; F24S 20/20;
F24S 23/79; F24S 30/452; F24S
2023/872; F24S 2030/136; F24S 23/12;
F24S 23/70; F24S 23/31; F24S 23/745;
F24S 25/12; F24S 2023/87; F24S
2023/876; Y02E 10/40; Y02E 10/47;
Y02E 10/52; Y02E 10/44; Y02E 10/45;
Y02E 10/46; Y02E 10/42; Y02E 10/50;
Y02E 10/60; Y02E 10/41; G02B
19/0042; G02B 7/183; G02B 5/10; G02B
19/0023; G02B 5/09; G02B 19/0019;
G02B 19/0028; G02B 17/002; G02B
26/0816; G02B 27/0006; G02B 5/045;
G02B 7/1827; G02B 19/0047; G02B
26/0825; G02B 5/0808; G02B 17/004;
G02B 17/006; G02B 19/00; G02B
19/0004; G02B 19/0033; H01L 31/0547;
H01L 31/0543; H01L 31/0525; H01L
31/054; H01L 31/052; H01L 31/055;
H01L 31/056; H01L 31/18; H01L 29/70;
H01L 31/022466; H01L 31/02366; H01L
31/04; H01L 31/043; H01L 31/0521;
H01L 31/0549; H01L 31/1892; H02S
40/22; H02S 20/10; H02S 20/30; H02S
20/32; H02S 20/00; H02S 40/44; H02S
30/20; H02S 40/00; H02S 40/36
See application file for complete search history.

(56) References Cited

OTHER PUBLICATIONS

Ruiz et al.: "Lightweight off-axis 8m class telescope: a case study to ELT appoximation", Jul. 7, 2004, XP040183067.
Swinyard: "The European Contribution to the SPICA Mission", Jul. 12, 2008.
Johns: "The Gian Magellan Telescope (GMT)", Jun. 23, 2006.

* cited by examiner

SUPPORTING AND HANDLING SYSTEM FOR OPTICAL DEVICES AND INSTRUMENTATION

BACKGROUND OF THE INVENTION

1) Field of the Invention

The present invention refers to a supporting and handling system for optical devices and instrumentation.

In general, the present invention refers to the field of telescopes for astronomy and/or radio-telescopes and/or sun concentrators, of the optical aiming or discovering devices, which comprise collimating mirrors or systems on- or off-axis having a focusing action, such as for example, a segmented parabolic mirror in a primary unit, or a combination of mirrors and/or mirrors and other optical components on- and off-axis and/or scientific instrumentation in combination with mirrors and other components.

2) Background Art

Generally, a structure for aligning, pointing, tracking, for optical devices can be composed, for example, of a primary mirror, which can also be composed of combinations of concentric mirrors with different geometry, and a secondary mirror, a secondary system composed of several optical components or a first focus instrument, other optical components such as tertiary mirrors and/or mutually combined multiple mirrors together with systems of lenses for collimation and optical adaptation, and other optical collimating or compensating systems, also active and/or adaptive. As an example, consider a telescope as representative of this set of components, since it is conservative in termini of accuracy and complexity with respect to other systems, such as radio-telescopes and sun concentrators, which are characterized by more limited technical restrictions.

Generally, the components of a telescope are mutually physically connected by a very rigid structural system, whose purpose is keeping the optical train aligned. Upon increasing the sizes of the telescope, the structure becomes imposing and the distances between the optical components can be high, with the consequent need of having to make highly complex, heavy rigid structural systems having big sizes. The telescope further requires constraints to the ground with a high structural stiffness, from the flexural and from the torsional point of view, two to the big sizes of the telescope and of the need to keep the global system's own frequencies high, which depend strongly on the stiffness of the constraints to ground. Once made, a telescope can be modified with difficulty, so that the optical components of the telescope remain fixed and replaceable with difficulty, since the mechanical structure is built to support and keep the basic optical components. It is therefore difficult to replace the secondary mirror with other types of mirror or with first-focus instruments, two to the complexity and the difficulty in physically interacting with the mirror itself or the instrument structurally constrained to the top of the telescope, otherwise the fastening area is made too complex, with the consequent weight increase of the system. Similar difficulties can be found if one has to replace the primary mirror with a different mirror, unless one modifies or even wholly replace the supporting unit of the mirror itself, which is one of the major parts of the telescope. Moreover, the use of different systems positioned in place of the secondary mirror requires highly different fastening positions, which cannot be managed relatively easily.

Therefore, the optical configuration of the telescope is in practice set when designing and producing, and is scarcely or absolutely not modifiable. The presence of the carrier structure of the two units, usually composed of a trellis-type system, can imply difficulties in maintenance operations for the primary and secondary mirrors, two to the strict manoeuver margin during maintenance activities. Radio-telescopes and above all telescopes require the production of complex and invasive structures, which are scarcely versatile and costly, extending their times, which adversely affect the continuity of basic search programs. Two to such reason, instruments are more and more used for extremely competitive search programs, since their cost is often too high.

The use of a traditional structure implies the following limits/disadvantages: the maximum acceptable mirror sizes exceed with difficulty 10 meters of diameter unless there are segmented mirrors. However, a classic supporting structure is still being considered also for sizes greater than 10 meters. This implies making imposing, invasive and extremely costly systems, which makes more and more sporadic the production of medium/big sized telescopes. The replacement of the secondary optical system moreover is not normally allowed and, when possible, it is extremely cumbersome already for small telescopes, unless complex procedures are performed, which require long integration times and setup.

The telescopes must be free from vibration effects induced or generated by the system itself.

However, above all the secondary optics is subjected to vibrations with high frequency, since the structural stiffness of the system must be guaranteed, in order to keep the optics aligned at different inclinations of the telescope. Given the sizes of the structures, the vibration effects of the optical components are anyway evident; the structural distances are such that the vibrations are anyway unavoidable and manageable with difficulty, given the high frequencies which the structural sub-sections determine.

In order to limit the vibrations and the offsets caused by the wind pressure on the structure of the telescope, screens (wind screen) are made which becomes an integral part of the housing device.

The high-frequency vibrations which can be compensated with difficulty cause disturbances and depreciation of the performances of the integrated optical system; the masses of the various sections require structural balancing, and the keeping the shape of the optical components occurs through the use of active supports, which free the optics shape from the structural distortions two to thermal and gravitational effect to which the structure is subjected; a complex and accurate system, where the accuracy in the making of an optical train essentially depends on the mechanical structure, requires costly structural workings of big mechanical sub-sections.

In a big-sized telescope, the structural distortions depend on the altitude angle, two to the gravitational loads of the sub-assemblies composing the telescope itself, such as for example the supporting structure of the primary mirror whose translation must be compensated by a controlled distortion of the remaining part of the telescope, such as for example the distortion of structural sections, which must be designed so that their distortion compensates at least partly that of the structure which supports the secondary mirror, so that the optical components still remain aligned. One or more active sections then optimize the distortion residual, which cannot be structurally compensated two to the accuracy required by the optical system, much greater than the accuracy which can be obtained only with the passive structural compensation. To optimize the collimation, therefore, compensating elements are necessary, which are both passive and active structural elements, such as for example the active optics which, in addition to keep the optical errors within the provided tolerances, regulate the positions of the optical components so that they remain anyway correctly collimated and oriented towards the radiation source towards which the system is theoretically aimed.

The housing building assumes a major role, since it includes a multitude of functions, auxiliary and complementary to those of the telescope, such as for example wind screens, conditioning systems, hydrostatic unit for supporting the telescope, in addition to the need of having available a building handling weighing hundreds and, in the latest cases, thousands of tons, which do not determine disturbance effects transmitted to the telescope and to the instrumentation through ground.

A complete system requires relevant foundations for the telescope and for the housing structure, which has costs nowadays comparable with those of the housed telescope, if not greater. Given the sizes of the whole system and of the housing building, it is always necessary to operate on big territory areas, which must be leveled, modified by building invasive and costly civil works. All this is translated into excessive costs, which determine the scarceness of the works, and therefore a slowing-down of the technologic and scientific progress.

A critical aspect deals with the works which are unusable in sites different from the original one, unless having excessive development costs and times.

The prior art is given by patent EP2639618 B1, dealing with a supporting structure of a primary mirror formed of a rotation structure in altitude, with two arc-shaped elements mutually facing and rotating around an altitude rotation axis of the primary mirror, a frame which extends between the two arc-shaped elements, below the primary mirror and connected to the arc-shaped elements at the ends and a main supporting structure comprising many supporting members adapted to connect one or more points on the circumference of the primary mirror with the frame, so that the own weight of the primary mirror is supported by the arc-shaped members through the supporting members and the frame, thereby reducing the curvature difference between the center and the edges of the surface of the primary mirror.

The invention in patent EP2639618 B1 provides a solution which allows dividing the weight of the primary mirror on a combination of sub-structures adapted to support the primary mirror. The invention of patent EP2639618 B1 is an example of separation of supporting structures or sub-structures of the two, primary and secondary, optical units, to be able to divide the weight of big-sized optics.

Moreover, the prior art is given by U.S. Pat. No. 4,111,184 A, dealing with a sun energy concentrator, comprising supporting means of an azimuth structure horizontally rotating around a vertical axis. Such supporting means are composed of a pair of arcuate guides, which vertically extend to support a parabolic reflector supported by a wheel sliding along the pair of arcuate guides. The sun energy concentrator comprises means for balancing the weight of the parabolic reflector, first motored means coupled with the balancing means adapted to impose to such parabolic reflector to assume different desired elevations, second motored means to allow the azimuth structure to assume different azimuth positions.

The invention of U.S. Pat. No. 4,111,184 A provides for a solution comprising sliding arcuate guides to allow the azimuth rotation of a big-sized parabolic mirror.

In spite of these efforts, there remain the need of a constructive simplification, removing a great part of the structure of the telescope to also reduce the construction costs, in addition to the invasiveness.

A problem which has already been described before is in fact given by the invasiveness of a traditional system which includes voluminous foundations necessary in case of classical structures, and therefore also of the structures mentioned in the cited patents, foundations which are necessary to guarantee the required stiffness for controlling the position, and therefore for the static and dynamic structural stability, and for keeping high structural frequencies in order to obtain good performances for pointing and tracking, aligned with required accuracies of the optical systems, such as for example the telescopes.

Documents Ruiz, Elfego; Sohn, Erika; Luna, Esteban; Salas, Luiz; Cruz-Gonzalez, Irene: "Lightweight off-axis 8 m class telescope: a case study to ELT approximation", Spie, PO Box 10 Bellingham WA 98227-0010 USA, 7 Jul. 2004, XP040183067; WO 2012/079143 A1; Swinyard, Bruce: "The European Contribution to the SPIGA Mission", Spie, PO Box 10 Bellingham WA 98227-0010 USA, 12 Jul. 2008, XP040439353; and Johns, Matt: "The Giant Magellan Telescope (GMT)", Spie, PO Box 10 Bellingham WA 98227-0010 USA, 23 Jun. 2008, XP040227614 disclose systems according to the preamble of claim 1.

SUMMARY OF THE INVENTION

Taking as reference the most conservative representative system, and therefore a big-sized optical telescope, the main object of the present invention is updating and rationalizing the concept of system adopted so far in the prior art, and creating a new standard which, by keeping the optical sections physically separate, guarantees a multitude of advantages with respect to the prior art, making the systems more efficient in terms of flexibility, adaptability, functionality, modularity, efficiency, quick construction and installation, and in terms of costs, with immediate consequences on scientific and technologic efficiency.

The known systems are still based on the concept of solving, with the heavy hardware, namely with great amounts of materials and structures, the functions and the problems which could be solved with great flexibility through control systems, by fully exploiting the potentiality in terms of accuracy, speed and flexibility of measuring, processing, actuating, automation and robotic systems which are currently possible.

A further object of the invention is modifying the concept of traditional structural system which nowadays affects any type of installation and modifying the concept of protected structure, to use it also simultaneously in different, mutually complementary sectors without interruptions, such as for example the use of the system as telescope and as radio-telescope simultaneously, or the use of the structure both as telescope and/or radio-telescope simulator and, as alternative, to immediately switch it into a system for producing energy of the concentration type, exploiting in parallel the potentiality of the auxiliary support and maintenance systems for keeping the performances constant and efficient during 24 hours. Within the invention, therefore, many innovative solutions are defined, which make the structure adequate to its time and reduce its costs, guaranteeing availability of time of use in the different research sectors, which have been steadily grown in these latest years.

A further object is providing a system for supporting and regulating optical components comprising a structure with arcs equipped with sliding guides to allow part of the system of to be oriented in azimuth and in altitude.

A further object is providing a system for supporting and regulating optical components comprising means for throwing-in, protecting, recovering the secondary and tertiary optical units, and the first-focus instrumentation.

A further object is providing a system for supporting and regulating optical components capable of housing a first unit and a series of second units.

The above and other objects and advantages of the invention, as will result from the following description, are obtained with a supporting and handling system for optical devices and instrumentation, as claimed in claim 1. Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) can be made to what is described, without departing from the scope of the invention as defined by the enclosed claims.

BRIEF DESCRIPTION OF THE DRAWINGS

The present invention will be better described by some preferred embodiments thereof, provided as a non-limiting example, with reference to the enclosed drawings, in which.

DETAILED DESCRIPTION OF PREFERRED EMBODIMENTS

With reference to the Figures, it is possible to note that a supporting and handling system for optical devices and instrumentation comprises first and second motored means to move at least one primary unit 1 and a secondary unit 2.

Such at least one secondary unit 2 is kinematically and dynamically independent with respect to the primary unit 1.

Moreover, the system for supporting and regulating optical components comprises a control system (e.g., control system 9) to allow synchronizing the motion of the first and of the second motored means, to allow coordinating the motion of such at least one primary unit 1 and secondary unit 2, and to keep aligned the mechanical/optical components of the installed instrumentation and control the vibrations and every spurious effect which determines the misalignment of the components of the instrumentation.

Figure 1:
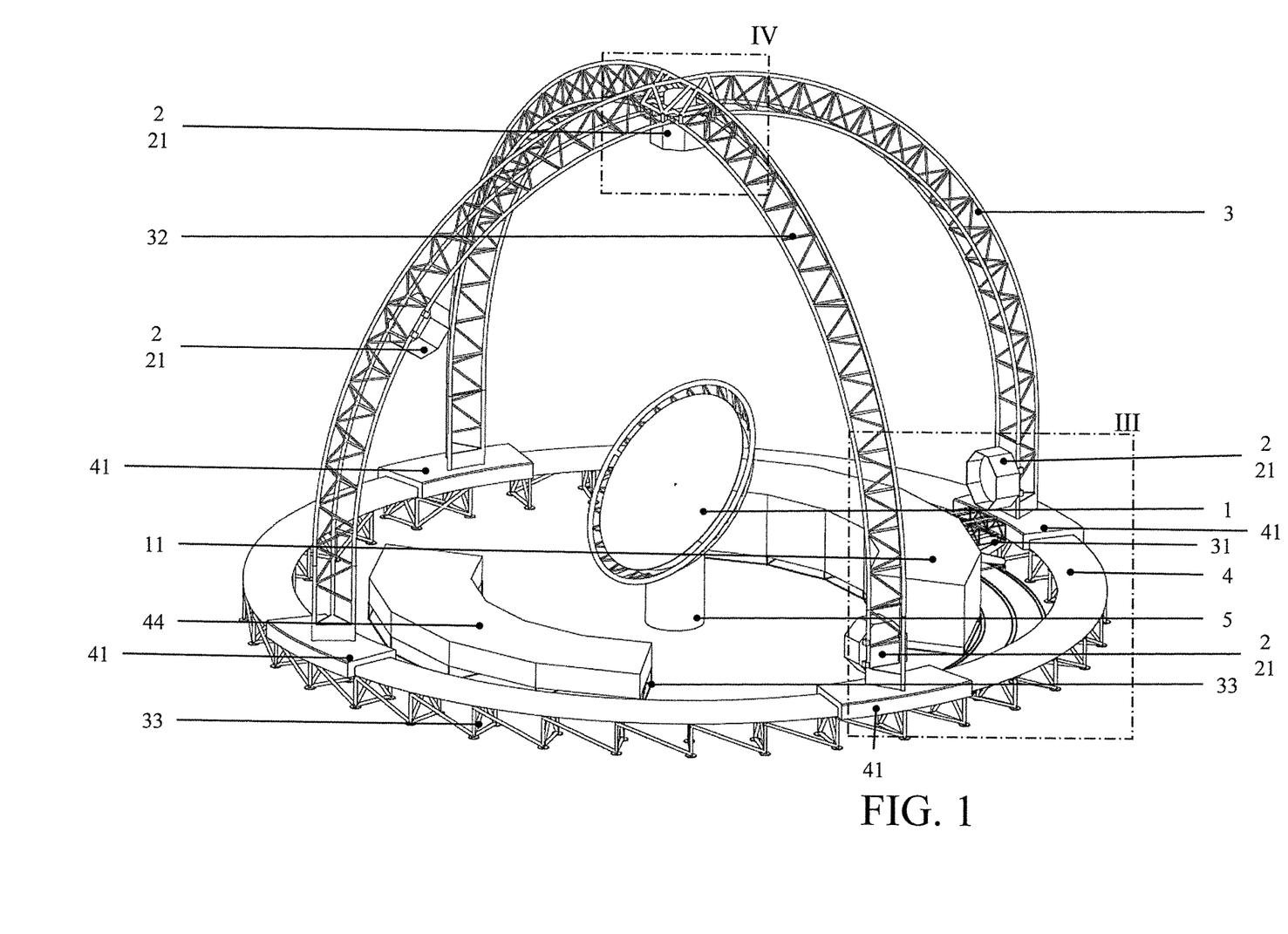
FIG. 1 shows a perspective view of an embodiment of the supporting and handling system for optical devices and instrumentation according to the present invention.
Figure 2:
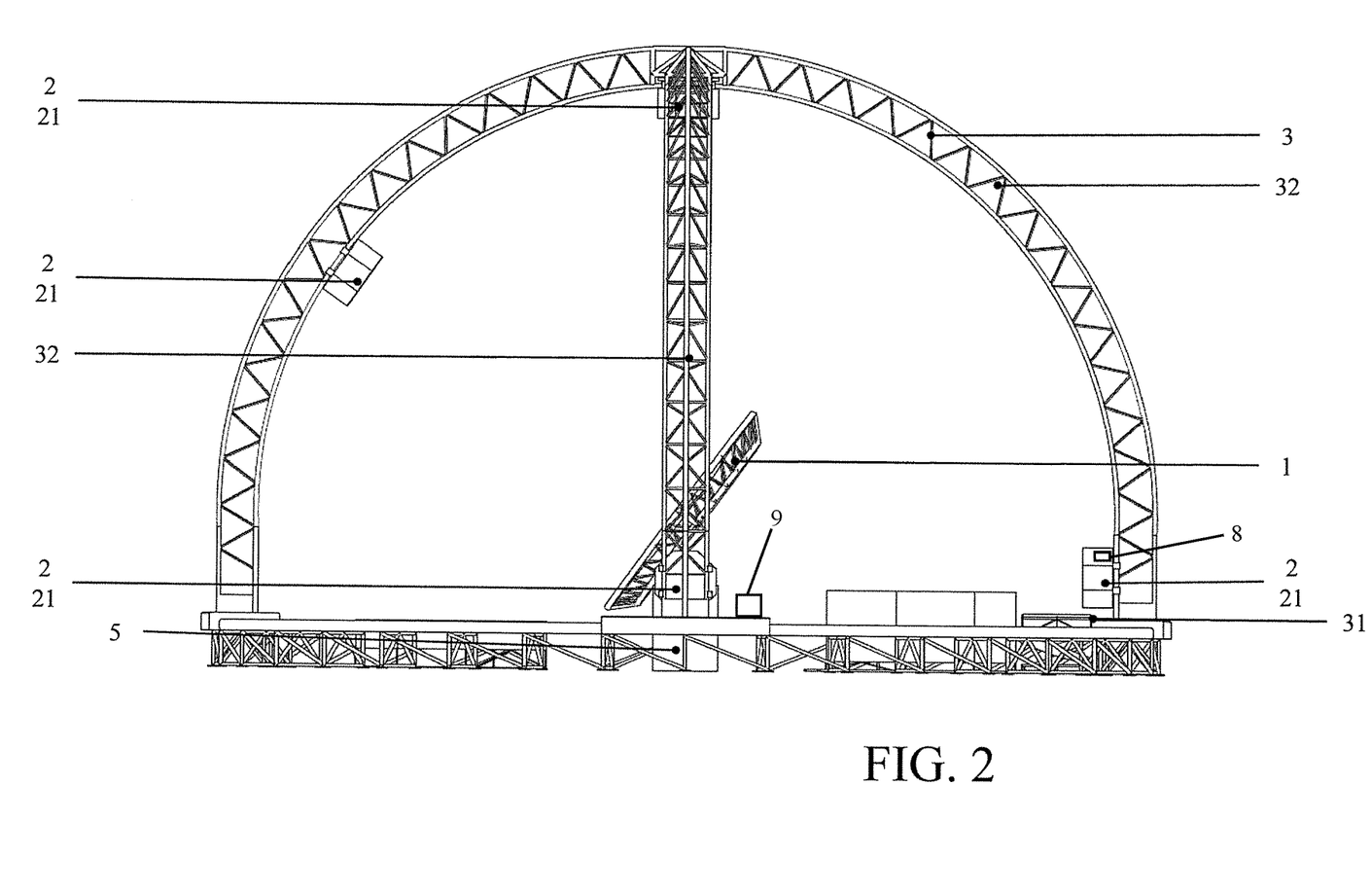
FIG. 2 shows a front view of an embodiment of the previous Figure.
Figure 3:
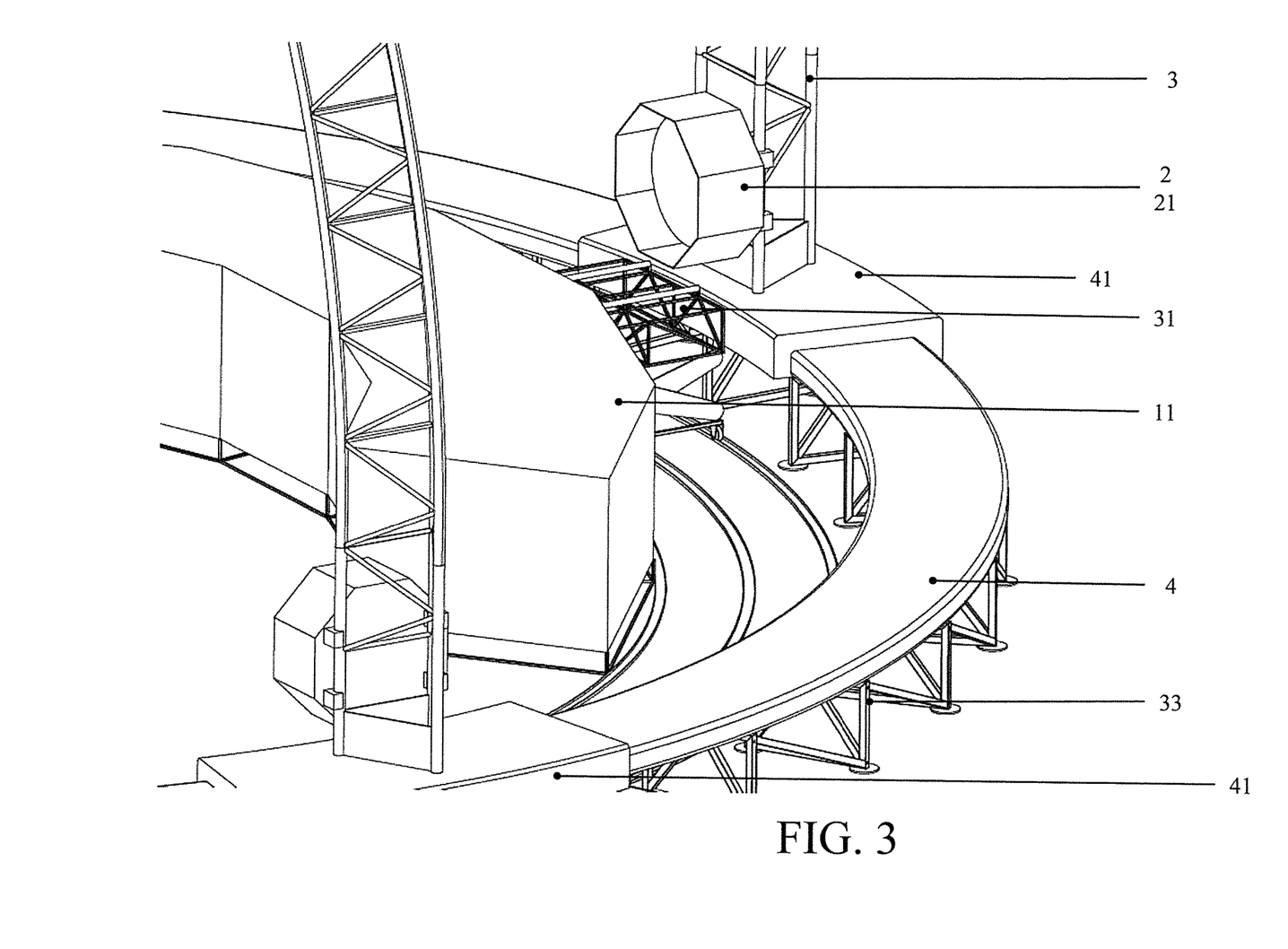
FIG. 3 shows an enlarged part III of FIG. 1.
Figure 4:
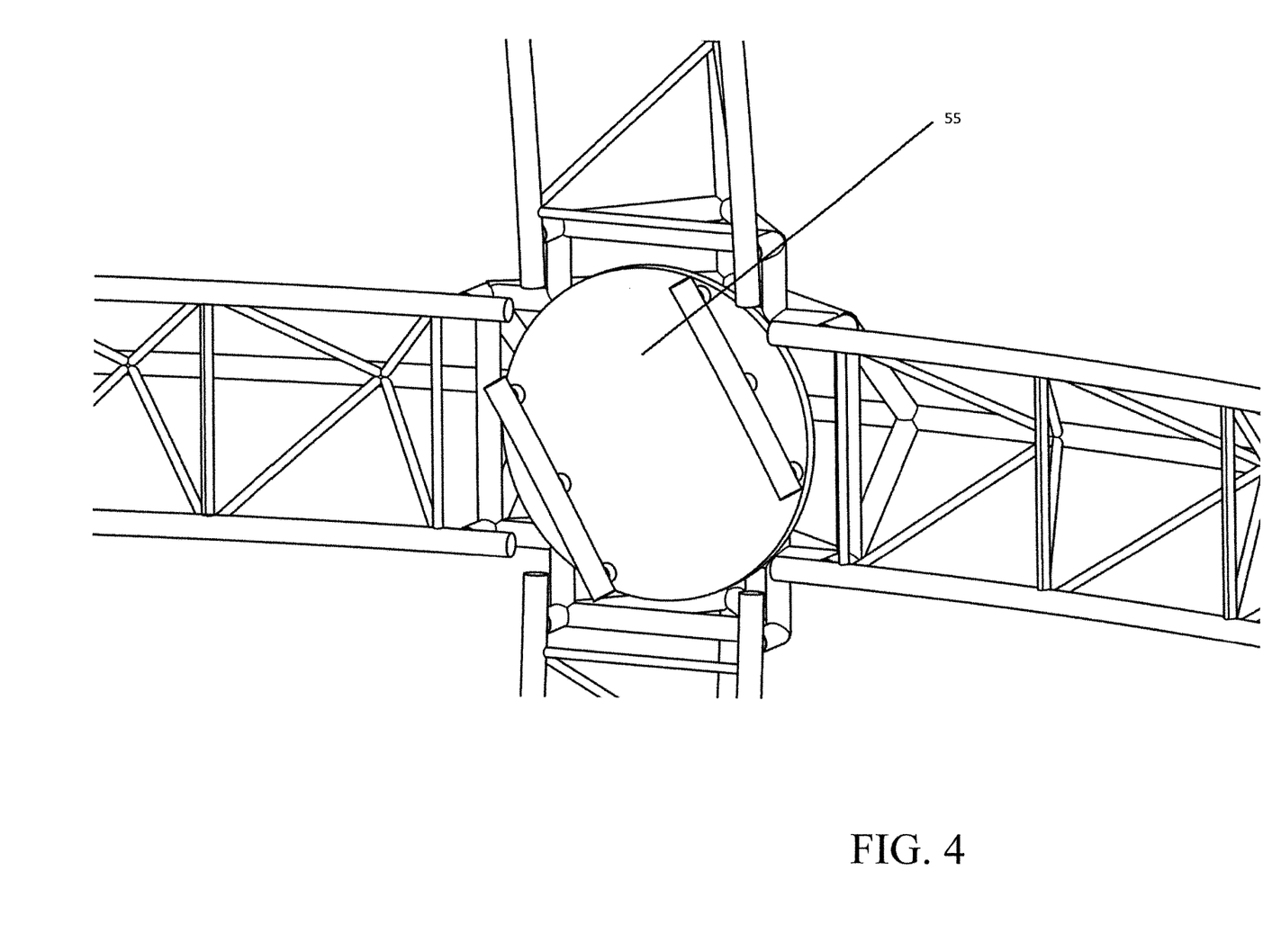
FIG. 4 shows an enlarged part IV from a different perspective of FIG. 1.

In particular, such at least one secondary unit 2 is connected to an arc-shaped structure 3 equipped with sliding guides which allows it to simulate the classic movement in altitude to allow the rotation of such at least one secondary unit 2 with respect to a virtual rotation axis in altitude. Moreover, the arc-shaped structure 3 rotates on sliding guides by means of synchronized azimuth rotation trolleys 41, determining the movement in azimuth of the structure of arches. Through an exchange device 55, all three trolleys 21 of any auxiliary structure 3 or 32 can transit at the zenith, FIG. 4.

The azimuth sliding guides 4 are or can be supported by a structure which can be easily adapted to asperities and height variations of the ground, avoiding to have to modify the configuration of the ground itself.

The anchorage to the ground of the supporting structure of the sliding guides in azimuth 4 by means of abutment pitches or plates 33 on a compacted ground, and big-sized zinc-coated fastening screws, or when necessary making small abutment, ground-anchoring plinths. Any other method could be used, provided that it is not invasive and not left at the free definition by workers or working sub-groups not operating according to the general non-invasiveness logics, which is one of the major concepts on which the system of the present invention is based. The supporting structure is organized in order to leave available areas for passing heavy vehicles, which can transit below the plates themselves. The sliding structure in azimuth can also be fastened to the ground without using a secondary, ground-anchoring structure. In such case, areas for passing the means of transport are defined, which do not physically interfere with the structure itself. The same ground-fastening methodology can be used for leveling and ground-anchoring areas, called technical units 11, primary unit 1, guesthouses and residences 44, in addition to what is necessary, also tracks used for moving a trolley 21.

According to the invention, the primary unit 1 is handled by means of a hexapod system modified in order to make the movements of the primary unit 1 wider, through the use of a central, omnidirectional joint 5 and four extensible arms connected to the ground. Such modified hexapod system allows a space orientation of the primary unit 1 leaving the availability of a passing area, in the center of the primary unit 1, of the radiation possibly reflected by a mirror or by other sub-systems placed in the secondary unit 2.

The secondary units 2 are housed each in a trolley 21 sliding along the sliding guides in altitude of the arc-shaped structure 3.

Every trolley 21 is equipped with active and adaptive systems for stabilizing and compensating the vibrations (e.g., stabilizer 8) in low, medium and high frequency, and movements and offsets, of active and/or adaptive systems for mechanically/optically aligning on- or off-axis between every type of secondary unit 2 and the primary unit 1, of compensators of the field rotation, of communication interfaces with the control system and interface systems for providing services such as compressed air, information network, electric supply and every service, supply or sub-system necessary to guarantee the correct operation of the unit 2 and of the trolley 21, in addition to the third-party devices necessary for the secondary unit 2, which will be installed in the trolley 21, both in case of systems dedicated to collecting and conditioning the radiation for scientific purposes, and in case of radiation collecting systems used for transforming the radiation itself into electric and/or thermal energy. The system for compensating vibrations, for keeping the distance, for optimizing the position and for compensating the offset between the optical/mechanical axes of the primary unit 1 and the secondary unit 2, can also be used to enable the step of fastening the devices of the secondary unit 2 to the trolley 21. In this fastening step and for such purpose, the trolleys 21 can also use the movement in azimuth of the arc-shaped structures 3 and the movement of the trolleys 21 in altitude along the arc-shaped structures 3.

According to a preferred configuration, there are a number of technical units 11 inter-communicating for their use by the personnel of common facilities, and structurally and suitably interconnected through dedicated fastening points. Each technical unit 11 is aimed to store, integrate and maintain the secondary units 2. The secondary units 2 are transferred from the technical units 11 to the trolleys 21 by means of service trolleys 31 which, since moving and equipped with handling and aligning systems, are capable of being correctly aligned with the suitably arranged accesses of the technical units 11 and with the aligning and fastening devices arranged in the trolleys 21. The technical units 11 can house a number of secondary units 2 greater than the number of trolleys 21. Such aspect complies with the general view of having available responding secondary units 2 dedicated to different scientific activities or related to the production of energy. Taking into account as an example the use of the system as telescope, the quick fastening of the secondary unit 2 to the trolleys 21 allows having available several instrumentations to be used alternately during the nights of observation.

The technical units 11 allow equipping, preparing and maintaining the secondary units 2 which will be connected to the trolleys 21. Purpose of the technical units 11 is creating optimum operating conditions for technical activities of integration, setting-up, testing, maintenance, modifications of the secondary units 2. The technical units 11 allow operating on the secondary units 2 under every possible atmospheric condition and protect the secondary units 2 from powders and atmospheric agents. The technical units 11 are conditioned and partitioned in order to avoid energy wastes. They are equipped with general-purpose workshops and with all necessary facilities, such as for example possible cranes, forklifts, any type of necessary fixture for performing technical-scientific activities of any type to be performed on the secondary units 2.

The ground-fastening systems 33 related to the main units, such as 4, 5, 11 and in the sites where this is deemed necessary, can be active and regulate the leveling of the fastening points to the ground due to the differential measure of the heights of all bearing points with respect to one or more defined reference fastening points. In such case, the compensating system is integrated in the abutting and ground-fastening systems, and takes as reference the ground-fastening points which do not modify their position. The regulating system is connected to the main managing system of the whole installation, and allows mapping and regulating the altimetry and activating possible alarms, if necessary, in order to provide the values of parameters and offset which come into play in the pointing, tracking and interacting system between the systems for moving the secondary unit 2 from the technical units 11 to the trolleys.

According to a preferred configuration, the trolley 21 moves through a system with redundant rack which allows moving along the arc-shaped structure 3 from one end to the other.

A variation, not shown, is given by a single arc-shaped structure 3, braced through suitable tie-rods, also fastened to dedicated azimuth rotation trolleys 41 moved synchronously with the other azimuth rotation trolleys 41 of the arches on azimuth sliding guides 4.

The azimuth rotation trolleys 41 are synchronized.

A variation, not shown, is given by a system of different concentric arc-shaped structures 3, possibly with a different radius of curvature and with consequent different radial position in terms of connection on the azimuth rotation trolleys 41 assembled onto the base, to avoid interferences between the arches and keep a perfectly circular, monocentric shape to allow assembling mutually typologically different secondary units 2 in terms of distance with respect to the connection interface placed inside the trolleys 21. The arches are connected to the azimuth rotation trolleys 41 by means of joints, which allow their inclination with respect to the vertical, remaining anyway fastened to the other arches by means of a sliding system, which allows them to move and be slanted one with respect to the other. In this configuration, the trolleys 21 can always transit at the zenith, moving the unused arch by such an angle as to allow positioning the trolley 21 at the zenith, and further not falling in the field of view of the combined optical system. The azimuth rotation trolleys 41 are synchronized.

A further variation is given by a system composed of many arc-shaped structures 3 mutually connected at the zenith, where a system 55 allows the trolleys 21 of any arch to transit at the zenith. The azimuth rotation trolleys 41 are synchronized. To such further variation, it is possible to add another one, not shown, given by a system composed of the arc-shaped structure 3 braced through an auxiliary structure 32 divided into two half-arches which can independently move with respect to the arc-shaped structure 3 rotating on the azimuth sliding guides 4 onto which it is hinged.

The described and non-limiting exchange system 55 allows being able to always orient any trolley 21 at the zenith. The trolley 21 can be present in many units on every arc-shaped structure to allow assembling different optical systems and/or instruments to be used according to possible technical-scientific programs.

The above variations allow using the system as telescope on different scientific programs, by suitably aligning the desired secondary unit 2 with the primary unit 1 by rotating the arc-shaped structures 3 in azimuth and moving the trolley 21 in altitude, consequently aligning the primary unit 1 and the secondary unit 2 towards the radiation source. The azimuth rotation trolleys 41 are synchronized.

According to a further variation, the system can comprise one or more secondary units 2 aligned with respect to the primary unit 1 to allow converting the incident radiation into electric and/or thermal energy by means of units suitable for such purpose, like for example concentration-type photovoltaic cells and/or units dedicated to the conversion of the incident radiation into thermal energy, also possibly supported by the cooling of the concentration-type photovoltaic cells. In this case, the system is used during the day, namely in the hours in which traditional telescopes are unused, producing electric energy for the services and for accumulation in accumulating units exploited to support night and day activities, making the technical/scientific installation autonomous from the energetic point of view. The use of the telescope during the day allows producing electric energy in a relevant way, above all since this type of installation is made in sites where the direct sun radiation is always very high, and therefore the conditions are optimum, for example for the operation of the concentration-type photovoltaic cells, as well as for any type of converter. The chance of modifying the optical profile of a primary mirror in the primary unit 1 by means of active supports consists in obtaining a concentrated radiation in non-imaging mode, and therefore optimally and uniformly distributed on the cells to obtain maximum performances and maximum efficiency of the cells themselves.

A first form of use of the system for supporting and controlling scientific instrumentation deals with a set of optical systems and/or instruments to use a telescope in different scientific programs housed in a set of respective trolleys 21 by a respective set of secondary units 2, each secondary unit 2 being aligned in a synchronized way with respect to the primary unit 1, the rotation of the arc-shaped structure 3 in azimuth allowing to align the primary and secondary units 1 and 2 by suitably orienting them towards a source of radiations.

The main advantages consequent to the structural separation of the primary unit 1 and of the secondary unit 2 are: chance of removing a great part of the structure of the telescope, reducing the construction costs; constructive simplification of the primary system; increase of reliability, performances and functional flexibility of the whole system; insulating the primary section from the secondary section, which allows using handling systems which are different from the traditional ones; reducing the costs and simplifying the assembling and disassembling operations of the system; it is not needed to level the integration area, since the structures are equipped with active, local regulating systems, and therefore systems for suiting local altimetry; chance of making big-sized structures, though keeping the costs small; reduced invasiveness of a primary system handled by a modified system of an hexapod type, namely with central joint and four rods with variable length, which allow, suitably connected, a wide slanting angle of the primary unit 1 with respect to the vertical; the hexapod-type structures or the like allow transforming all stresses into peak loads, and therefore the structure is constrained to the ground with fastening headworks and plinths, not being it necessary to guarantee an excessive torsional and flexural stiffness required for example by traditional handling systems, such as for example the alt-azimuth system, with a final saving in terms of foundations, auxiliary works, etc.; quick installation and disassembling. In case of assembling primary mirrors, such type of support allows obtaining also the rotation of the mirror common for equatorial structures, useful in scientific programs, which provide for a polarimetry. The described system, not shown, also provide for the use of structural supports which reduce the length of extensible jacks to the strict necessary length to obtain the movements of the primary unit 1 within the necessary range for its scientific uses and for technical activities. The system allows fastening the structure to the ground by means of fastening elements, as in case of units 4, 5, 11 and of all those who need it. The bearing surfaces are obtained by means of plates, whose leveling offsets are managed in the functions of the control system for jacks. The use of plates and fastening elements allows obtaining fastening points to the ground characterized by an adequate stiffness both under compression, traction and radial, due to the presence of the screws, which determine the radial structural constraints. These fastening points can be removed without any consequence for the ground and can be used again. In other cases, when the fastening elements are not enough (for example, ground quality, etc.), it is possible to make small foundation plinths, extremely less invasive than traditional foundations.

According to an embodiment of the present invention, the secondary optical system is installed on moving arches concentric to the primary optics to allow positioning, pointing, tracking the secondary section in altitude, while the rotation of the arches allows the movement in azimuth of the secondary optics to be able to align it with the primary section. It is not necessary to make precision systems of arches, since the trolleys 21 are equipped with systems for regulating, orienting and locally correcting the vibrations and the misalignment between primary and secondary units 2, which also include possible constructive errors of the system with arches.

To reduce the vibrations of the primary unit 1 when it is subjected to the wind, it is provided to install a dedicated unit for jagging the wind front, usually called wind screen. Such system rotates on concentric tracks to the primary unit 1 and avoids the direct impact of the wind on the primary unit 1.

The detachment of the secondary system from the primary system allows assembling many secondary systems on the arches, in order to use, at the adequate time, the most suitable one for the preset scientific activities. This can allow both performing the peak programs and the basic search programs without interruptions. During the observations, it will be possible to use many units 2 alternately, modifying the orientation of the arches with respect to the primary system 1.

The trolleys 21 are equipped with of stabilizing systems of the vibrations with low, medium and high frequency, and with an orienting system for the alignment between primary and secondary systems, in addition to compensate for the field rotation. Moreover, the trolleys 21 are moved along the arc-shaped structures 3 in altitude and from the rotation in azimuth of the arc-shaped structures 3 on the system 4. The trolleys 21 are therefore equipped with all necessary systems to keep perfectly aligned the primary and the secondary units 1, 2, which are simultaneously also oriented towards the target with the necessary accuracy.

The trolleys 21 are equipped with interfaces towards the secondary units 2 and anyway towards every type of system which must be installed. The interface is structured in order to guarantee the possible connection of every type of system inside the trolley 21. This interface is included in the documents which must be taken into account by the manufacturers of the instrumentation to be installed in the cabin, so that the manufactures of the secondary units 2 can make the suitable connection interfaces to the trolleys 21.

Since the trolleys 21 are equal, their costs decrease and their reliability increases. Being identical, their reliability, meant in terms of service continuity and quality, is maximized. In case of failure of a trolley 21, it will be enough to assemble the instrumentation in another trolley 21. Their conceptual easiness and the suitable redundancies in terms of actuation and control make the chance of failures in practice extremely low. Being the system modular and the instrumentation made in order to be fastened to specific interfaces, the replacement of the secondary unit 2 from a trolley 41 to another one is performed quickly.

In case of adverse climatic conditions, the heavier parts are in practice fastened to the ground and only the arches, which do not offer a substantial surface exposed to the wind, are exposed to bad weather, thereby contributing to remove the danger of triggering a structural instability due to aerodynamic effects.

The redundant rack system allows an accurate positioning in height without plays of the trolleys 21, since the cabin weight always keeps the gear gripped and at the zenith; when the gravitational load is limited, part of the racks is used in adaptive torque pre-load to cancel the transmission backlashes. The handling system of every unit uses irreversible reducers to guarantee the safety of the system and spurious movements in case of absence of supply. A system of parachute brakes further allows keeping the system safety high in case of a severe failure of the system for moving and controlling the trolleys 21.

The trolleys 21 are mechanically and electrically connected to the arc-shaped structure 3. The electric connection can be obtained with any reliable method, such as for example unwinding cables. The information connection can be obtained either by means of a WiFi transmission system and/or with optical fiber systems in order to obtain a high data transmission rate.

According to an embodiment of the present invention, when the system is used as telescope, the system can be operating both during the day and during the night, being able to operate both for astronomic searches in the optics and near infrared by night, and for searches in the radio-astronomy field by night and by day. During the night, the telescope can also be used as radio-telescope and as optical telescope simultaneously, and depending on needs, it can also be used to produce electric and thermal energy both on-axis and off-axis during the day, as previously described. The chance of having available secondary units 2 capable of operating both in optics and in radio is allowed by the general flexibility of the system. In case of energy production, the converting systems can also be installed on supports assembled on the guides at the base of the arches or on azimuth rotation trolleys, which slide on the guides themselves in an intermediate position between the arches in order to avoid the vignetting by the arches. The azimuth sliding structure is made of mutually connected sectors. The handling of the arches in azimuth occurs oleo-dynamically or electrically with localized units. The azimuth rotation trolleys and the altitude displacement trolleys are mutually synchronized by means of the main control system. The load of the arches on the path can be limited by a compressed air system, which reduces the friction load on the path, system which is preferable with respect to the hydrostatic one. The movement of the trolleys on the arches is of the oleo-dynamic or electric type.

In this configuration, not shown, of off-axis receptive units, the transmission of electric and thermal energy does not occur through the cables and pipes unwound along the arches, but directly through simpler and more direct systems due to the high powers in play. The accumulating units can in this case be arranged directly on the main trolleys at the base of the arches, and therefore near the energy converting systems, distributing from such position the energy to the different units being present in the whole installation. This preferable configuration allows minimizing losses due to Joule effects between converting units and accumulating units, which will be equipped with inverters for distributing alternate current energy to the different units present in the installation.

In case of adverse atmospheric conditions, the secondary units 2 can be transported in the technical units 11 or remain protected in the trolleys which can be frontally closed. The primary system instead has available a protection with a tarpaulin handled by the same system used for the maintenance of the mirrors. The maintenance of the mirrors is constant, namely also daily, providing both the localized washing of the mirrors and their cyclic aluminum-coating by means of an automatic system.

Modern optical telescopes are characterized by huge metal masses, which show a high thermal inertia. During the day, the telescopes are protected by buildings where there are conditioning assemblies, which keep the internal temperature of all structures exposed to the temperature foreseen for the following night. For such reason, at dusk, the housing building, also called dome due to historical facts, is opened and placed in front of the wind, and anyway in a different direction from that where the sun radiation comes from. In such a way, the wind tends to make the temperature uniform for the metallic masses at the actual temperature of the outside environment, reducing the difference between computed provided temperature and actual temperature. This is necessary to avoid ascending currents due to temperature differences between metallic masses and outside environment, differences which could qualitatively impair the scientific results. Obviously, function of the building is also protecting the telescope in case of adverse atmospheric conditions. The system of the present invention, instead, is structurally characterized by a limited thermal inertia. It is constantly exposed to the wind, adapting itself almost in real time to the temperature variations of the environment. The limited use of conditioning systems and of a protecting structure drastically reduces the production costs and the management costs. In case of great temperature variations between night and day, and where some daily functions are not used, it is provided to use conditioners and/or endothermal heat exchangers to keep technical units 11 and personnel buildings 44 in temperature. The term personnel buildings means those room aimed to be used as guesthouses, eating areas, rooms dedicated to meetings, technical rooms, laboratories. The heat exchangers, if used, are placed far enough from the installation not to affect the conditions of personnel buildings, and the technical units 11 are equipped with a conditioning and obscuring system in support of night activities in the astronomy field. Endothermal exchangers are anyway preferable.

Among the variations, the one dealing with a cyclic aluminum-coating and protecting system for the primary system must be mentioned. A cover is further provided for protecting the primary unit 1 in the periods of lack of use or in case of adverse atmospheric conditions, also if an almost constant use is foreseen for the primary unit 1 and for the secondary units 2. In the astronomy sites, an automatic system takes care of cyclically removing the mirrors, moving them in the maintenance chamber, not shown. This activity can be performed cyclically with the necessary frequency established depending on the site conditions. The technical units 11 are equipped with polishing units and with surface treating devices, the maintenance or the preparation of new optical units, such as for example damaged mirror segments or new types of mirror segments. The withdrawal of the mirrors occurs in a programmed way, namely all mirrors are cyclically treated. The robotic system anyway performs a check of the surface quality of the mirrors to verify status and quality of the surface layer in order to possibly give priority to those mirror sections which, due to their exposure, need more frequent treatments.

The modular structure of the present invention is adapted to be used for all types of optics. The secondary section can therefore comprise both secondary optics, for example a mirror, or directly the focal plane. In the use as telescope, it is obviously provided to use thin optics equipped with active compensating system. In this example, the optical system also provides for the set of adaptive optics.

An alternative configuration included in the present Application is the one in which the structures housing the personnel are placed below the tracks in order to exploit the structures themselves, also as abutment for the supporting structure in azimuth. Such type of solution further reduces the impact on the territory. In this configuration, the spaces made free in the central installation area can be used for depositing further primary units 1, which can be easily connected to the primary supporting structure, using the arches as lifting system.

I claim:
1. A supporting and handling system for optical devices and instrumentation, comprising:
   at least one primary unit;
   at least one secondary unit, the at least one secondary unit being independent with respect to the primary unit;
   first motored means adapted to move the primary unit;

second motored means adapted to move the secondary unit, an arc-shaped structure connected to the secondary unit, the arc-shaped structure being equipped with sliding guides in altitude with respect to a ground, the sliding guides being designed for rotating the at least one secondary unit with respect to an altitude rotation axis, the arc-shaped structure comprising azimuth rotation trolleys on azimuth sliding guides and being designed for rotating around a vertical axis with respect to the ground by means of the azimuth rotation trolleys on the azimuth sliding guides, a hexapod system connected to the primary unit in order to move it, the hexapod system comprising an omni-directional central joint and four extensible arms adapted to be connected to the ground through a structure, a control system configured to synchronize a motion of the first and the second motored means to coordinate the motion of the at least one primary unit and the at least one secondary unit, and a trolley wherein the at least one secondary unit is housed, the trolley being configured to slide along the sliding guides in altitude of the arc-shaped structure through a rack which allows moving along the arc-shaped structure from an end to another, wherein the supporting and handling system comprises several concentric arc-shaped structures, which meet at the zenith where an exchange system allows each trolley of the arc-shaped structures to transit at the zenith.

2. The supporting and handling system for optical devices and instrumentation of claim 1, wherein the azimuth sliding guides are supported by a structure adapted to suit itself to asperities and height variations of the ground by comprising pitches or bearing plates on a compacted ground and zinc-coated fastening screws, the bearing plates possibly placed on small abutment plinths designed to be fastened to the ground.

3. The supporting and handling system for optical devices and instrumentation of claim 2, wherein the trolley is equipped with systems for stabilizing the vibrations, for compensating the vertical axial rotation, for mechanically/optically aligning between the at least one primary unit and the at least one secondary unit, with interface systems for the communication with the control system and interface systems for services like compressed air, information network, electric supply and services or users for the operation of the system.

4. The supporting and handling system for optical devices and instrumentation of claim 3, further comprising at least one technical unit protected from external agents and containing the necessary instrumentation to be able to equip the trolley by transferring the instrumentation from the at least one technical unit to the trolley.

5. The supporting and handling system for optical devices and instrumentation of claim 1, configured for performing a relative roto-translation of different concentric arc-shaped structures with a different radius, which are designed to move one with respect to another, to be able to move the trolley over the zenith during their transit along the arc-shaped structures.

6. The supporting and handling system for optical devices and instrumentation of claim 1, further comprising a set of secondary units which include optical systems and/or instruments, housed in a set of respective trolleys of the supporting and handling system, each of the secondary units being adapted to be aligned in a synchronized way with respect to the primary unit, the rotation of the arc-shaped structure in azimuth, the motion in altitude of the trolleys and the motion of the primary unit allowing to align the primary unit and the secondary units by suitably orienting them towards a source of radiations.

7. The supporting and handling system for optical devices and instrumentation of claim 1, further comprising a robotic system configured to perform production, measure and characterization of new optical components and cyclic maintenance of those already present in the system.

* * * * *